US012332585B2

(12) United States Patent
Fujiwara et al.

(10) Patent No.: US 12,332,585 B2
(45) Date of Patent: Jun. 17, 2025

(54) SEAL MEMBER AND TONER STORAGE CONTAINER INCLUDING SAME

(71) Applicant: KYOCERA Document Solutions Inc., Osaka (JP)

(72) Inventors: Kazuaki Fujiwara, Osaka (JP); Yosuke Saito, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/626,679

(22) Filed: Apr. 4, 2024

(65) Prior Publication Data

US 2024/0345509 A1 Oct. 17, 2024

(30) Foreign Application Priority Data

Apr. 13, 2023 (JP) ................ 2023-065618

(51) Int. Cl.
*G03G 15/08* (2006.01)
*B32B 5/18* (2006.01)
(Continued)

(52) U.S. Cl.
CPC .......... *G03G 15/0898* (2013.01); *B32B 5/18* (2013.01); *B32B 5/32* (2013.01); *B32B 7/02* (2013.01);
(Continued)

(58) Field of Classification Search
CPC .......... G03G 15/0872; G03G 15/0886; G03G 15/0881; G03G 15/087; G03G 2215/0678; G03G 15/0898
See application file for complete search history.

(56) References Cited

U.S. PATENT DOCUMENTS

| 2012/0321341 A1 | 12/2012 | Hori et al. .................. 399/110 |
| 2014/0241757 A1* | 8/2014 | Kikuchi ............ G03G 15/0886 399/258 |

(Continued)

FOREIGN PATENT DOCUMENTS

| JP | 2004-226721 A | 8/2004 |
| JP | 2012-018375 A | 1/2012 |

*Primary Examiner* — Jessica L Eley
(74) *Attorney, Agent, or Firm* — Stein IP LLC

(57) ABSTRACT

A seal member has a first seal layer which is opposite a container main body; and a second seal layer which is opposite a cap member and the compression slip resistance $\rho$ [N] of the first seal layer, the compression rate k [%] of the first seal layer, the thickness $T_1$ [mm] of the first seal layer, the compression residual strain $\varepsilon_1$[%] of the first seal layer, the thickness $T_2$ [mm] of the second seal layer, the compression residual strain $\varepsilon_2$[%] of the second seal layer, the thickness $T_n$ [mm] of the seal layer other than the first seal layer and the second seal layer and the compression residual strain $\varepsilon_n$ [%] of the seal layer other than the first seal layer and the second seal layer satisfy $0<\rho/k<0.3$ and $0.04<T_2\varepsilon_2/(T_1\varepsilon_1+T_2\varepsilon_2+ \ldots T_n\varepsilon_n)<0.48$.

6 Claims, 7 Drawing Sheets

(51) Int. Cl.
  *B32B 5/32*  (2006.01)
  *B32B 7/02*  (2019.01)
  *B32B 7/12*  (2006.01)

(52) U.S. Cl.
  CPC ............. *B32B 7/12* (2013.01); *G03G 15/087* (2013.01); *G03G 15/0886* (2013.01); *B32B 2266/0278* (2013.01); *B32B 2307/72* (2013.01); *B32B 2307/7376* (2023.05); *B32B 2581/00* (2013.01)

(56) References Cited

U.S. PATENT DOCUMENTS

| | | | |
|---|---|---|---|
| 2015/0147096 A1 | 5/2015 | Hori et al. | G03G 15/0886 |
| 2015/0177650 A1* | 6/2015 | Shoji | G03G 15/0898 399/103 |
| 2016/0342109 A1 | 11/2016 | Hori et al. | G03G 15/0886 |
| 2020/0232561 A1* | 7/2020 | Dei | F16J 15/20 |

* cited by examiner

SEAL MEMBER AND TONER STORAGE CONTAINER INCLUDING SAME

INCORPORATION BY REFERENCE

This application is based upon and claims the benefit of priority from the corresponding Japanese Patent Application No. 2023-065618 (filed on Apr. 13, 2023), the entire contents of which are incorporated herein by reference.

BACKGROUND

The present disclosure relates to a seal member used in a coupling portion between a container main body and a cap member of a toner storage container which is fitted to an image forming apparatus using an electrophotographic process and stores a toner, and relates to a toner storage container which includes a seal member.

In an image forming apparatus of an electrophotographic system, a toner is supplied from a development device to an electrostatic latent image formed on the surface of an image carrying member (for example, a photosensitive drum), and thus development processing is performed. The toner used in the development processing as described above is supplied from a toner storage container to the development device. As the toner storage container, a toner storage container including a container main body which stores the toner and is rotated is known.

In the toner storage container configured as described above, the opening of the container main body may be covered by a cover which is not rotated when the container main body is rotated. In such a case, as compared with a case where a cover is rotated together with a container main body when the container main body is rotated, a toner easily leaks from between the container main body and the cover.

SUMMARY

A seal member according to an aspect of the present disclosure is arranged in a gap between a container main body and a cap member in a toner storage container that is removable from an image forming apparatus and includes the container main body, a transmission gear and the cap member. The container main body is cylindrical, stores a toner and is rotated. The transmission gear is fitted to the outer circumferential surface of the container main body on one end side in a state where a movement in a circumferential direction is restricted, and transmits a rotational driving force to the container main body. The cap member covers an opening which is provided in one end portion of the container main body in the direction of a rotational axis line, and holds a rotation stop state or is rotated at a speed lower than the container main body and the transmission gear when the container main body and the transmission gear are rotated. The seal member has a multilayer structure including a plurality of seal layers, the seal layers include: a first seal layer which is opposite the container main body; and a second seal layer which is opposite the cap member and in which the ratio of the thickness of the second seal layer to the thickness of the entire seal member is equal to or greater than 50% and the seal member satisfies formulae (1) and (2) below:

$$0 < \rho/k < 0.3 \quad (1)$$

$$0.04 < T_2\varepsilon_2/(T_1\varepsilon_1 + T_2\varepsilon_2 + \ldots T_n\varepsilon_n) < 0.48 \quad (2)$$

where ρ is a compression slip resistance [N] of the first seal layer, k is a compression rate [%] of the first seal layer, $T_1$ is a thickness [mm] of the first seal layer in a stacking direction, $\varepsilon_1$ is a compression residual strain [%] of the first seal layer, $T_2$ is the thickness [mm] of the second seal layer in the stacking direction, $\varepsilon_2$ is a compression residual strain [%] of the second seal layer, $T_n$ is a thickness [mm] of the seal layer other than the first seal layer and the second seal layer in the stacking direction and $\varepsilon_n$ is a compression residual strain [%] of the seal layer other than the first seal layer and the second seal layer.

DETAILED DESCRIPTION

Figure 1:
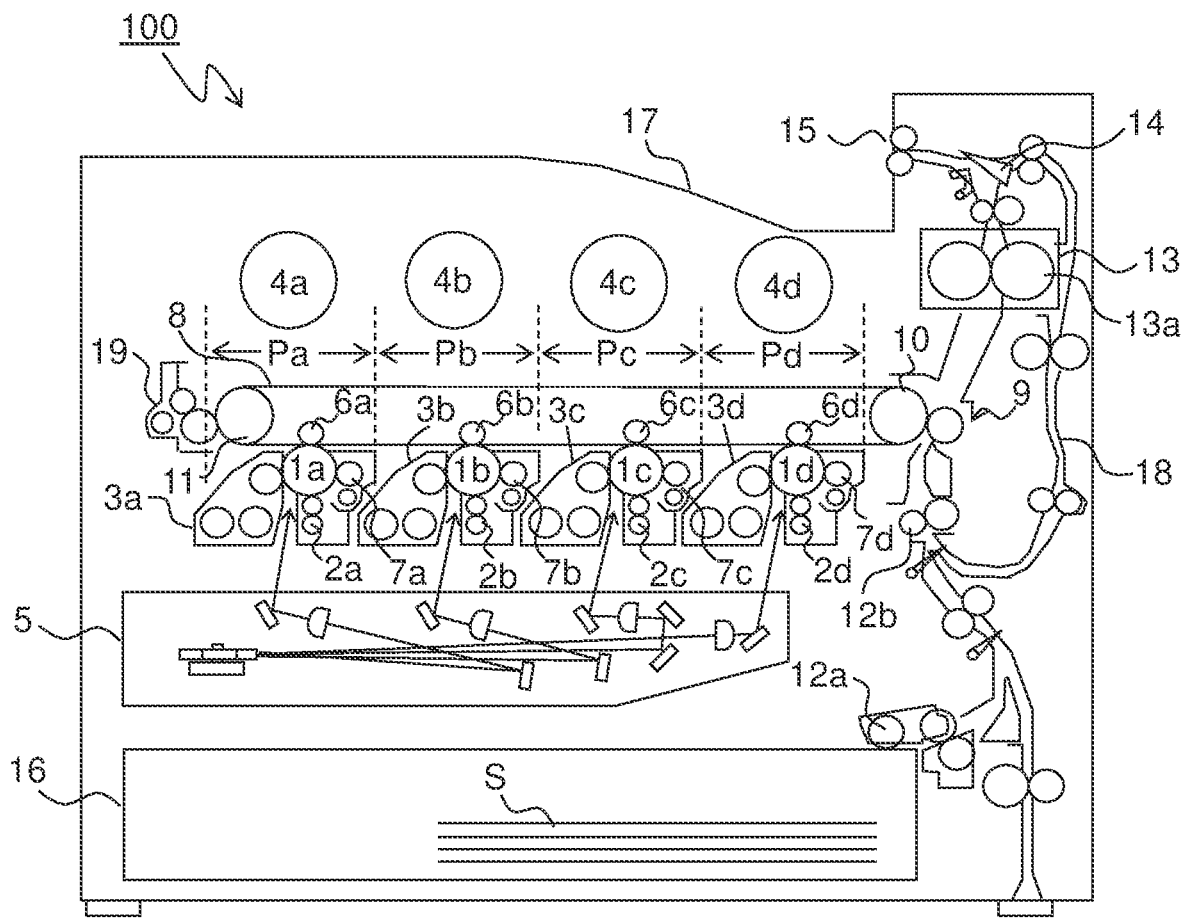
FIG. 1 is a schematic view showing an internal configuration of an image forming apparatus in an embodiment of the present disclosure.
Figure 2:
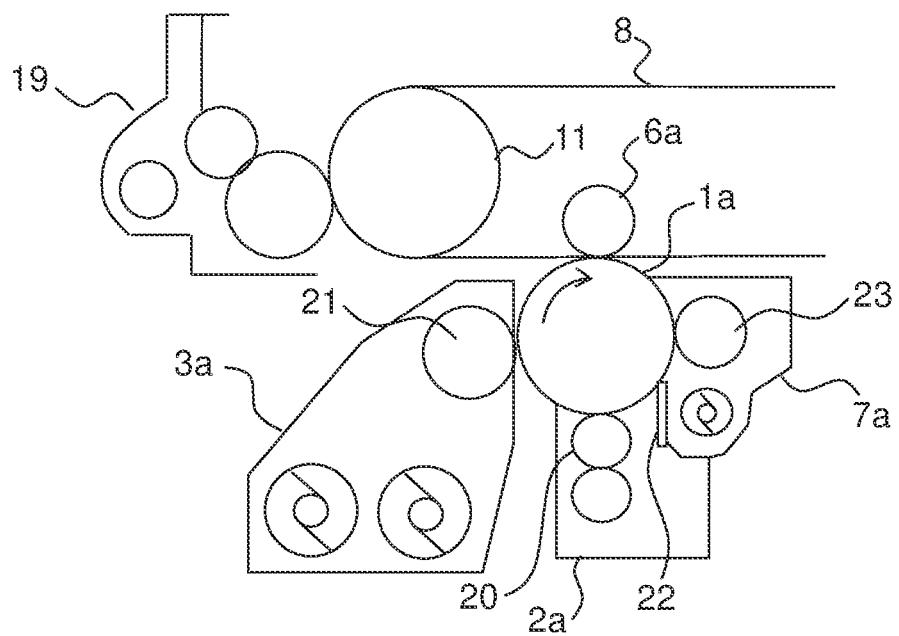
FIG. 2 is an enlarged view of an area around an image formation unit in FIG. 1.

An embodiment of the present disclosure will be described below with reference to drawings. FIG. 1 is a schematic view showing the configuration of an image forming apparatus 100 in the embodiment of the present disclosure, and FIG. 2 is an enlarged view of an area around an image formation unit Pa in FIG. 1.

The image forming apparatus 100 shown in FIG. 1 is a so-called tandem-type color printer, and has the following configuration. Inside the main body of the image forming apparatus 100, four image formation units Pa, Pb, Pc and Pd are provided sequentially from an upstream side in a conveyance direction (the left side in FIG. 1). These image formation units Pa to Pd are provided to correspond to images of four different colors (yellow, cyan, magenta and black), and the image formation units Pa to Pd each perform steps of charging, exposure, development and transfer to sequentially form images of yellow, cyan, magenta and black.

In the image formation units Pa to Pd, photosensitive drums $1a$, $1b$, $1c$ and $1d$ are provided which carry visible images (toner images) of the colors. Furthermore, an intermediate transfer belt 8 which is rotated in a counterclockwise direction in FIG. 1 is provided adjacent to the image formation units Pa to Pd. The toner images formed on the photosensitive drums $1a$ to $1d$ are sequentially transferred on the intermediate transfer belt 8 which is moved in contact with the photosensitive drums $1a$ to $1d$, and are thereafter transferred at a time on a sheet S serving as an example of a recording medium in a secondary transfer unit 9. Furthermore, the toner images are fixed on the sheet S in a fixing unit 13, and the sheet S is thereafter ejected from the main body of the image forming apparatus 100. While the photosensitive drums $1a$ to $1d$ are being rotated in a clockwise direction in FIG. 1, image formation process is performed on the photosensitive drums $1a$ to $1d$.

The sheets S on which the toner images are to be transferred are stored in a sheet cassette 16 arranged in a lower portion of the main body of the image forming apparatus 100, and the sheet S is conveyed to a secondary transfer roller 9 via a paper feed roller $12a$ and a registration roller pair $12b$. As the intermediate transfer belt 8, a belt which has no seam (seamless belt) is mainly used.

The image formation units Pa to Pd will then be described. Although the image formation unit Pa will be described in detail below, the image formation units Pb to Pd basically have the same configuration, and thus the description thereof is omitted. As shown in FIG. 2, a charging device $2a$, a development device $3a$ and a cleaning device $7a$ are arranged around the photosensitive drum $1a$ along the direction of rotation of the drum (the clockwise direction in FIG. 2), and a primary transfer roller $6a$ is arranged through the intermediate transfer belt 8. On an upstream side in the direction of rotation of the intermediate transfer belt 8 relative to the photosensitive drum $1a$, a belt cleaning unit 19 is arranged which is opposite a tension roller 11 through the intermediate transfer belt 8.

A procedure for image formation in the image forming apparatus 100 will then be described. When a user inputs an instruction to start image formation, a main motor (not shown) first starts the rotation of the photosensitive drums $1a$ to $1d$, and the surfaces of the photosensitive drums $1a$ to $1d$ are uniformly charged by the charging rollers 20 of the charging devices $2a$ to $2d$. Then, a light beam (laser light) which is emitted from an exposure device 5 is applied to the surfaces of the photosensitive drums $1a$ to $1d$, and thus electrostatic latent images corresponding to image signals are formed on the photosensitive drums $1a$ to $1d$.

In development devices $3a$ to $3d$, predetermined amounts of toners of the colors of yellow, cyan, magenta and black are charged. When the ratios of the toners in two-component developers charged into the development devices $3a$ to $3d$ drop below specified values due to the formation of the toner images described later, the toners are supplied from toner containers $4a$ to $4d$ to the development devices $3a$ to $3d$. The toners in the developers are supplied by the development rollers 21 of the development devices $3a$ to $3d$ onto the photosensitive drums $1a$ to $1d$ and are electrostatically adhered thereto. In this way, the toner images corresponding to the electrostatic latent images formed by the exposure from the exposure device 5 are formed.

Then, an electric field is applied by primary transfer rollers $6a$ to $6d$ between the primary transfer rollers $6a$ to $6d$ and the photosensitive drums $1a$ to $1d$ at a predetermined transfer voltage, and the toner images of yellow, cyan, magenta and black on the photosensitive drums $1a$ to $1d$ are primarily transferred onto the intermediate transfer belt 8. The images of these four colors are formed in a predetermined positional relationship for forming a predetermined full-color image. Thereafter, in order to prepare for the subsequent formation of new electrostatic latent images, the toners which are left on the surfaces of the photosensitive drums $1a$ to $1d$ are removed by the cleaning blades 22 and the rubbing rollers 23 of the cleaning devices $7a$ to $7d$.

When the intermediate transfer belt 8 starts to rotate in the counterclockwise direction by the rotation of a drive roller 10 caused by a belt drive motor (not shown), the sheet S is conveyed from the registration roller pair $12b$ to the secondary transfer roller 9 provided adjacent to the intermediate transfer belt 8 with predetermined timing, with the result that the full-color image is transferred. The sheet S to which the toner images have been transferred are conveyed to the fixing unit 13. The toners left on the surface of the intermediate transfer belt 8 is removed by the belt cleaning unit 19.

The sheet S conveyed to the fixing unit 13 is heated and pressurized by a fixing roller pair $13a$, the toner images are fixed to the surface of the sheet S and thus the predetermined full-color image is formed. For the sheet S on which the full-color image has been formed, the conveyance direction thereof is distributed by a branch portion 14 which is branched in a plurality of directions, and the sheet S is ejected to an ejection tray 17 by an ejection roller pair 15 without being processed (or after being fed to a double-sided conveyance path 18 where images are formed on both surfaces).

Figure 3:
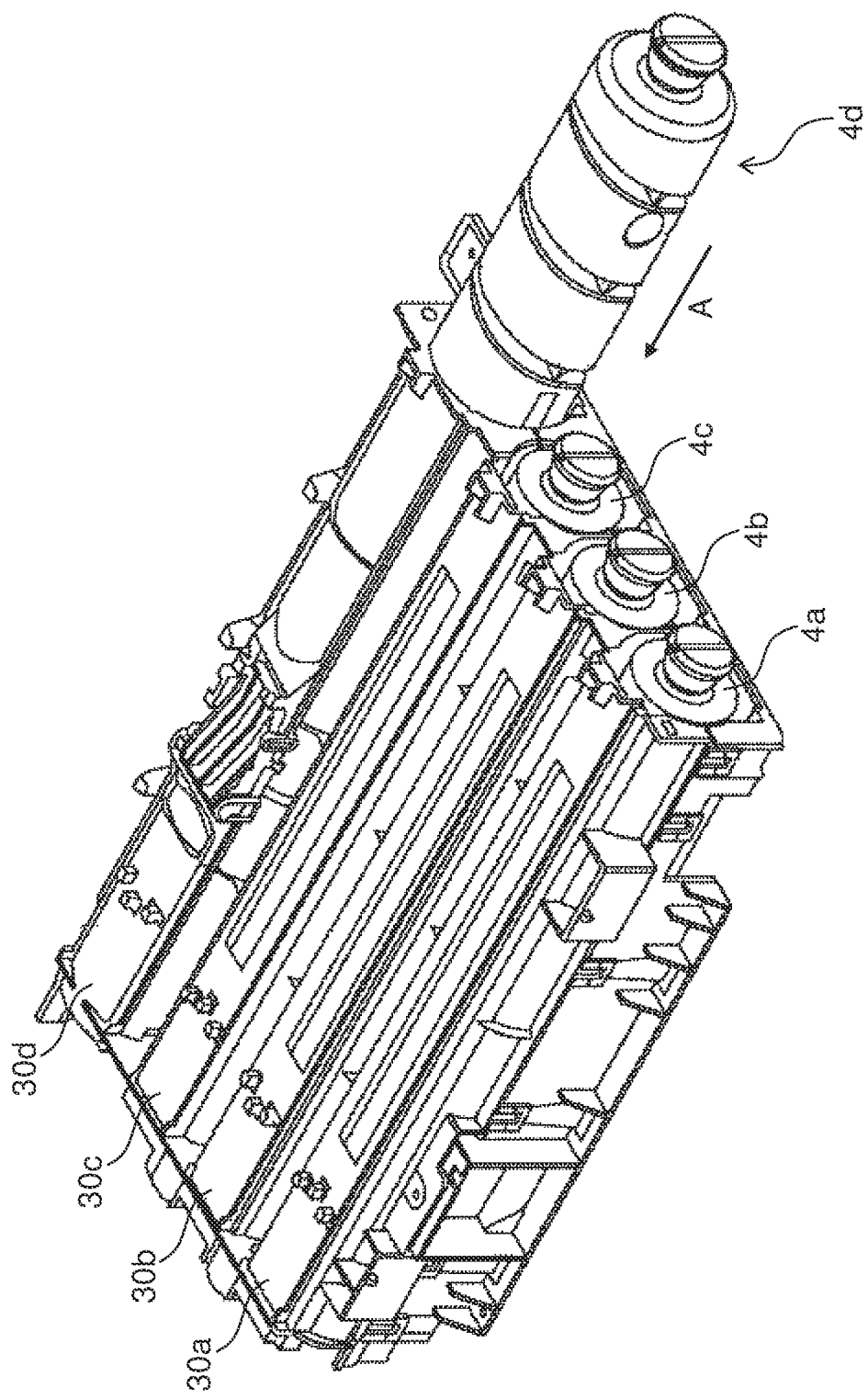
FIG. 3 is a perspective view showing toner containers and container fitting portions in the embodiment of the present disclosure.

The toner containers $4a$ to $4d$ will then be described. FIG. 3 is a perspective view showing the toner containers $4a$ to $4d$ and container fitting portions $30a$ to $30d$. In FIG. 3, only the toner container $4d$ is shown in a state where the toner container $4d$ is being fitted to the container fitting portion $30d$, and the toner containers $4a$ to $4c$ are shown in a state where the toner containers $4a$ to $4c$ have been fitted to the container fitting portions $30a$ to $30c$.

As shown in FIG. 3, the toner containers $4a$ to $4d$ are fitted to the container fitting portions $30a$ to $30d$ along the direction of insertion toward the back side (left back side of FIG. 3) from the front side (right front side of FIG. 3) of the image forming apparatus 100. The container fitting portions $30a$ to $30d$ are aligned in a left/right direction. Each of the container fitting portions $30a$ to $30d$ is formed in the shape of a cylinder which extends in a forward/backward direction. The outside diameter of the toner container $4d$ in which the toner of black is stored is larger than the outside diameters of the toner containers $4a$ to $4c$ in which the toners of yellow, cyan and magenta are stored. The inside diameter of the container fitting portion $30d$ is larger than the inside diameters of the container fitting portions $30a$ to $30c$.

In a lower portion of each of the container fitting portions $30a$ to $30d$ on a downstream side in the direction of insertion, a toner supply port 303 (see FIG. 8) is provided. The toner supply ports 303 communicate with the interiors of the development devices $3a$ to $3d$ of the image formation units Pa to Pd via supply pipes 304 (see FIG. 8) which extend in an up/down direction.

Figure 4:
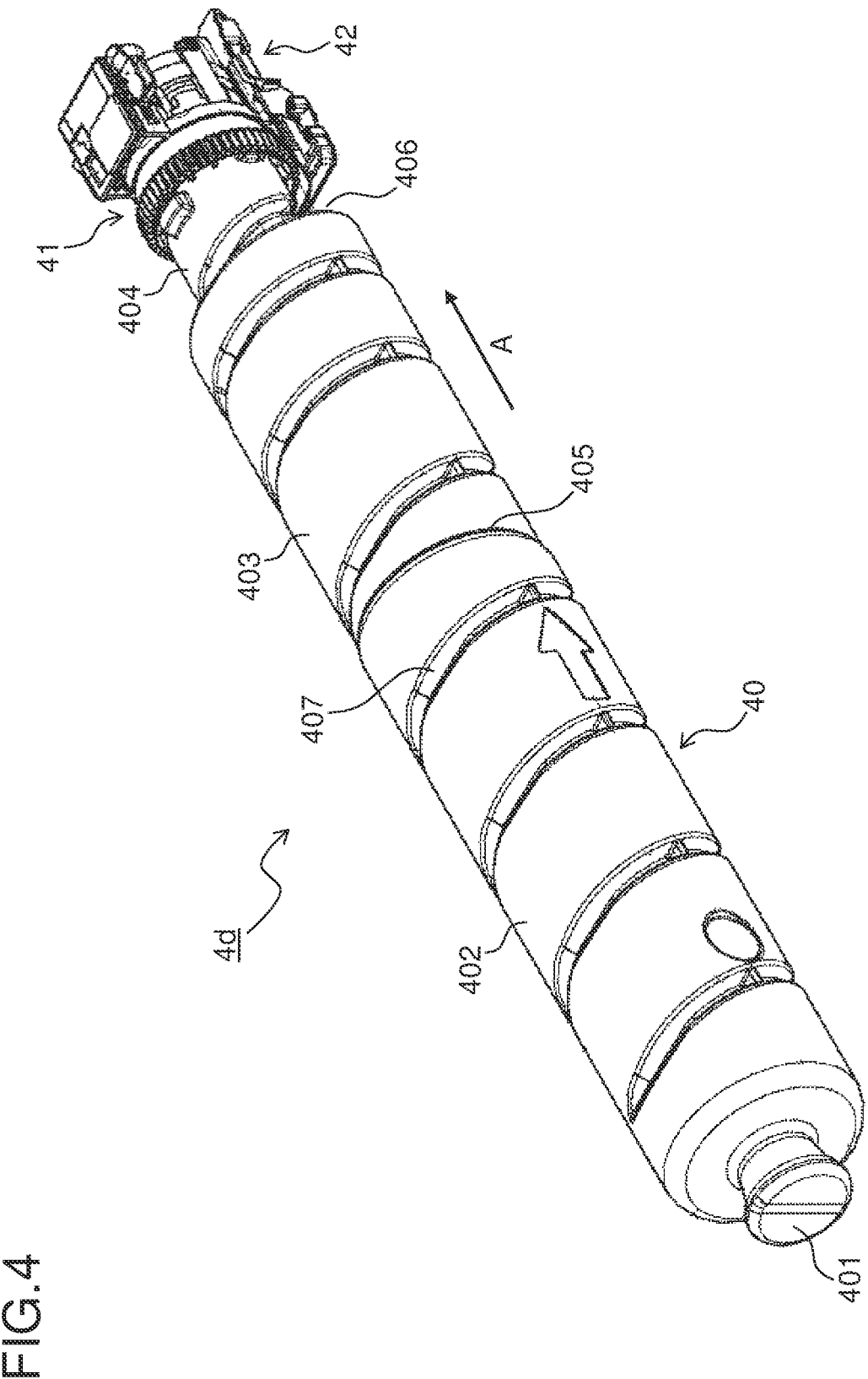
FIG. 4 is a perspective view when the toner container is viewed from an upstream side in the direction of insertion of the toner container in the present embodiment.
Figure 5:
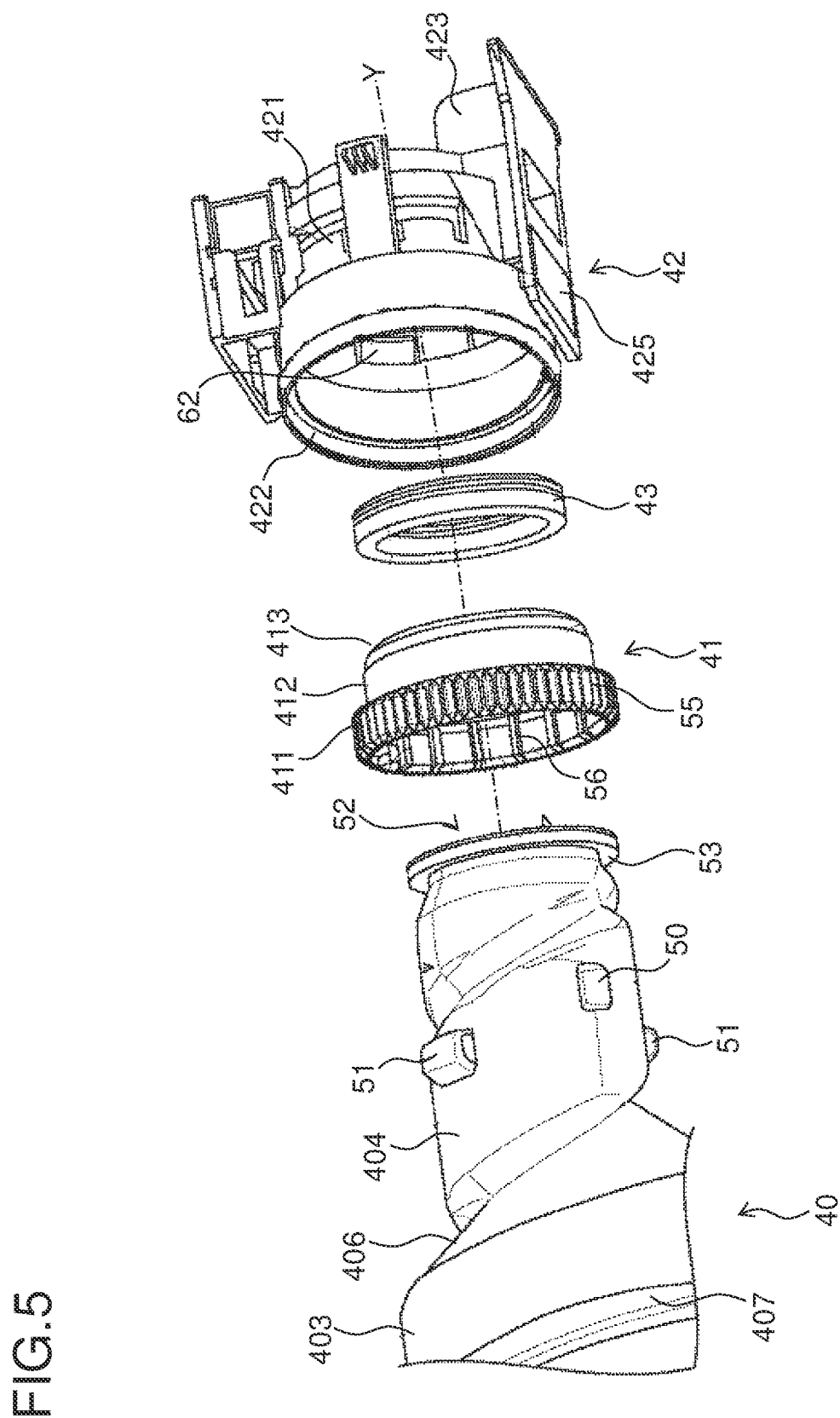
FIG. 5 is an exploded perspective view of an end portion of the toner container on a downstream side in the direction of insertion of the toner container in the present embodiment.
Figure 6:
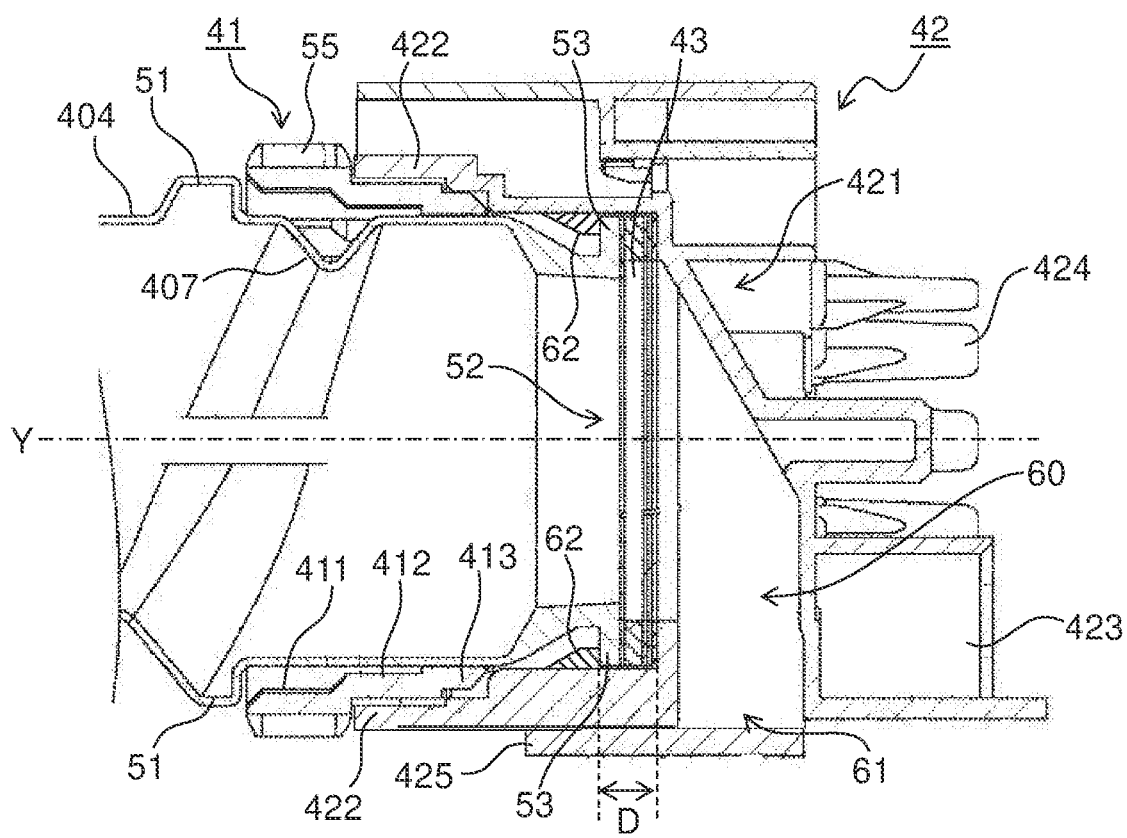
FIG. 6 is a cross-sectional view of the end portion of the toner container on the downstream side in the direction of insertion of the toner container in the present embodiment taken along an axial direction.

FIG. 4 is a perspective view when the toner container 4d is viewed from an upstream side in the direction of insertion of the toner container 4d in the present embodiment. FIG. 5 is an exploded perspective view of an end portion of the toner container 4d on a downstream side in the direction of insertion of the toner container 4d in the present embodiment. FIG. 6 is a cross-sectional view of the end portion of the toner container 4d on the downstream side in the direction of insertion of the toner container 4d in the present embodiment taken along an axial direction. Although the toner container 4d storing the toner of black will be described below, the toner containers 4a to 4c storing the toners of yellow, cyan and magenta have the same configuration.

As shown in FIGS. 4 and 5, the toner container 4d includes a container main body 40, a transmission gear 41 which is fitted to a back portion of the container main body 40, a cap member 42 which is provided on the back side of the transmission gear 41 and a seal member 43 which is stored inside the cap member 42.

The container main body 40 is formed in the shape of a cylinder which extends along the direction of insertion into the container fitting portion 30d (the direction of an arrow A). In the present embodiment, the forward/backward direction of the image forming apparatus 100 is the longitudinal direction of the container main body 40. The container main body 40 is formed rotatably about a rotational axis line Y which extends in the longitudinal direction. In the container main body 40, the toner of black (not shown) is stored. The toner stored in the container main body 40 is conveyed from the front side to the back side of the image forming apparatus 100 (from the upstream side to the downstream side in the direction of insertion).

The container main body 40 includes a handle portion 401, a large-diameter cylinder portion 402 which is provided on the downstream side of the handle portion 401 in the direction of conveyance of the toner (direction of the arrow A), a medium-diameter cylinder portion 403 which is provided on the downstream side of the large-diameter cylinder portion 402 and a small-diameter cylinder portion 404 which is provided on the downstream side of the medium-diameter cylinder portion 403.

The handle portion 401 is provided at an end portion of the container main body 40 on the upstream side in the direction of insertion. The internal space of the handle portion 401 communicates with the internal space of the large-diameter cylinder portion 402. Each of the large-diameter cylinder portion 402, the medium-diameter cylinder portion 403 and the small-diameter cylinder portion 404 is formed cylindrically about the rotational axis line Y. The medium-diameter cylinder portion 403 is provided between the large-diameter cylinder portion 402 and the small-diameter cylinder portion 404. The outside diameter of the medium-diameter cylinder portion 403 is smaller than the outside diameter of the large-diameter cylinder portion 402, and is larger than the outside diameter of the small-diameter cylinder portion 404.

In the outer circumferential surface of the container main body 40, a substantially annular first step portion 405 is formed between the large-diameter cylinder portion 402 and the medium-diameter cylinder portion 403, and a spiral second step portion 406 is formed between the medium-diameter cylinder portion 403 and the small-diameter cylinder portion 404. The step of the first step portion 405 (the difference between the outside diameters of the large-diameter cylinder portion 402 and the medium-diameter cylinder portion 403) is smaller than the step of the second step portion 406 (the difference between the outside diameters of the medium-diameter cylinder portion 403 and the small-diameter cylinder portion 404).

A single spiral conveyance rib 407 is continuously provided on the inner circumferential surfaces of the large-diameter cylinder portion 402, the medium-diameter cylinder portion 403 and the small-diameter cylinder portion 404 in the container main body 40. The conveyance rib 407 protrudes substantially in a V-shape in cross section from the inner circumferential surface of the container main body 40 toward the inside in a radial direction.

On the outer circumferential surface of the small-diameter cylinder portion 404, a pair of first engagement protrusions 50 (rotation restriction portions) are provided. One of the pair of first engagement protrusions 50 is arranged so as not to overlap the conveyance rib 407. The other of the pair of first engagement protrusions 50 is arranged to overlap the conveyance rib 407. The pair of first engagement protrusions 50 are provided in positions which are symmetrical with respect to a point in the rotational axis line Y.

On the outer circumferential surface of the small-diameter cylinder portion 404, a pair of second engagement protrusions 51 (movement restriction portions) are provided. The second engagement protrusions 51 are arranged so as not to overlap the conveyance rib 407. The second engagement protrusions 51 are respectively arranged to be displaced 90 degrees from the first engagement protrusions 50 in a circumferential direction. In other words, the pair of first engagement protrusions 50 and the pair of second engagement protrusions 51 are arranged such that the positions thereof in the circumferential direction do not overlap each other.

In an end portion of the small-diameter cylinder portion 404 on the downstream side in the direction of insertion, a circular opening 52 is provided. On the circumferential edge portion of the opening 52, an annular flange portion 53 is provided which protrudes toward the outside in the radial direction.

The transmission gear 41 is fitted to the outer circumferential surface of the small-diameter cylinder portion 404 of the container main body 40. The transmission gear 41 is formed cylindrically about the rotational axis line Y. The transmission gear 41 includes a large-diameter portion 411, a medium-diameter portion 412 which is provided on the downstream side of the large-diameter portion 411 in the direction of conveyance of the toner and a small-diameter portion 413 which is provided on the downstream side of the medium-diameter portion 412. The outside diameter of the transmission gear 41 is decreased in the order of the large-diameter portion 411, the medium-diameter portion 412 and the small-diameter portion 413.

Gear teeth 55 are provided on the outer circumferential surface of the large-diameter portion 411. The diameter of the large-diameter portion 411 including the gear teeth 55 is smaller than the outside diameters of the large-diameter cylinder portion 402 and the medium-diameter cylinder portion 403 in the container main body 40, and is larger than the outside diameter of the small-diameter cylinder portion 404. An end portion of the large-diameter portion 411 on the upstream side in the direction of insertion is opposite the second engagement protrusions 51 of the container main body 40.

On the entire inner circumferential surface of the large-diameter portion 411 and the medium-diameter portion 412 of the transmission gear 41, a plurality of engagement ribs 56 are provided which extend along the direction of insertion. The engagement ribs 56 are provided at predetermined intervals in the circumferential direction (for example, 10 to 20 engagement ribs 56 are provided at regular intervals).

The pair of first engagement protrusions 50 are inserted between the two sets of engagement ribs 56 among the engagement ribs 56. In this way, the rotation of the transmission gear 41 relative to the container main body 40 is restricted. The engagement ribs 56 other than the two sets of engagement ribs 56 (engagement ribs 56 between which the first engagement protrusions 50 are not inserted) function as a reinforcement portion for reinforcing the transmission gear 41.

The cap member 42 covers the opening 52 of the container main body 40. The cap member 42 includes a main body portion 421, a holding portion 422 which extends from the main body portion 421 toward the upstream side in the direction of insertion, an engagement cylinder portion 423 which protrudes from the main body portion 421 toward the downstream side in the direction of insertion, a cover side restriction portion 424 which is provided on the upper side of the engagement cylinder portion 423 and a cover side shutter 425 which is provided on the lower side of the main body portion 421, the holding portion 422 and the engagement cylinder portion 423.

In the main body portion 421, a communication portion 60 is provided which communicates with the toner storage space of the container main body 40 via the opening 52 of the container main body 40. In the lower end of the communication portion 60, a toner discharge port 61 is provided.

The holding portion 422 is formed substantially in the shape of a cylinder which protrudes from the main body portion 421 to the side of the container main body 40 about the rotational axis line Y. The inner circumferential surface of the holding portion 422 is opposite the outer circumferential surfaces of the medium-diameter portion 412 and the small-diameter portion 413 of the transmission gear 41. On the inner circumferential surface of the holding portion 422 of the cap member 42, four locking portions 62 are provided. The locking portions 62 sandwich the flange portion 53 of the container main body 40 (end portion on the downstream side in the direction of insertion) and the seal member 43 in a gap D between the locking portions 62 and the main body portion 421. The gap D is narrower than the total thickness of the flange portion 53 and the seal member 43. Hence, the seal member 43 is compressed to have a predetermined thickness, and thus the sealing properties of the container main body 40 and the cap member 42 are maintained.

The holding portion 422 sandwiches the transmission gear 41 between the holding portion 422 and the second engagement protrusions 51 of the container main body 40. In this way, the movement of the transmission gear 41 in the direction of insertion into the container main body 40 is restricted, and the transmission gear 41 is prevented from falling off from the container main body 40.

The seal member 43 is formed in the shape of a ring, and is arranged on the inner side of the holding portion 422 of the cap member 42 in the radial direction. The seal member 43 is arranged between the flange portion 53 of the container main body 40 and the main body portion 421 of the cap member 42 in a state where the seal member 43 is compressed.

The seal member 43 is fixed to the surface (surface on the upstream side in the direction of insertion) of the main body portion 421 of the cap member 42 opposite the flange portion 53. Although the seal member 43 may be fixed to the flange portion 53 of the container main body 40, if the seal member 43 is fixed to the flange portion 53, the seal member 43 may make contact with the holding portion 422 to be damaged when the cap member 42 is fitted to the container main body 40. Hence, in terms of ease of assembly of the toner container 4d, the seal member 43 is preferably fixed to the main body portion 421 of the cap member 42.

Figure 7:
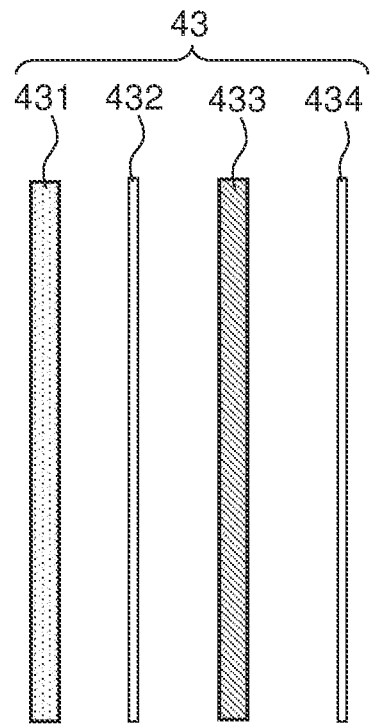
FIG. 7 is an exploded view showing the configuration of layers of a seal member.

FIG. 7 is an exploded view showing the configuration of layers of the seal member 43. The seal member 43 includes a first seal layer 431, a first adhesive layer 432, a second seal layer 433 and a second adhesive layer 434. The first seal layer 431 forms the outermost layer of the seal member 43 and is opposite the flange portion 53 of the container main body 40. The first seal layer 431 is formed of, for example, a urethane foam which is an elastic material. The first adhesive layer 432 is stacked on the back surface side (the downstream side in the direction of insertion) of the first seal layer 431. The first adhesive layer 432 is formed with, for example, a double-sided adhesive tape, and adheres the first seal layer 431 and the second seal layer 433.

The second seal layer 433 is stacked on the back surface side (the downstream side in the direction of insertion) of the first adhesive layer 432. The thickness of the second seal layer 433 is equal to or greater than 50% of the entire thickness of the seal member 43. The second seal layer 433 is formed of, for example, a urethane foam which is an elastic material. The second adhesive layer 434 is stacked on the back surface side (the downstream side in the direction of insertion) of the second seal layer 433. The second adhesive layer 434 is formed with, for example, a double-sided adhesive tape, and adheres the second seal layer 433 and the main body portion 421 of the cap member 42.

Then, operations of fitting the toner containers 4a to 4d to the container fitting portions 30a to 30d will be described. Since the operations of fitting the toner containers 4a to 4d are the same, only the operation of fitting the toner container 4d to the container fitting portion 30d will be described below, and the description of the operations of fitting the toner containers 4a to 4c to the container fitting portions 30a to 30c is omitted.

When the toner container 4d is fitted to the container fitting portion 30d, as shown in FIG. 2, the toner container 4d is inserted from an end portion of the toner container 4d on the downstream side in the direction of insertion (the side of the cap member 42) into the container fitting portion 30d.

Figure 8:
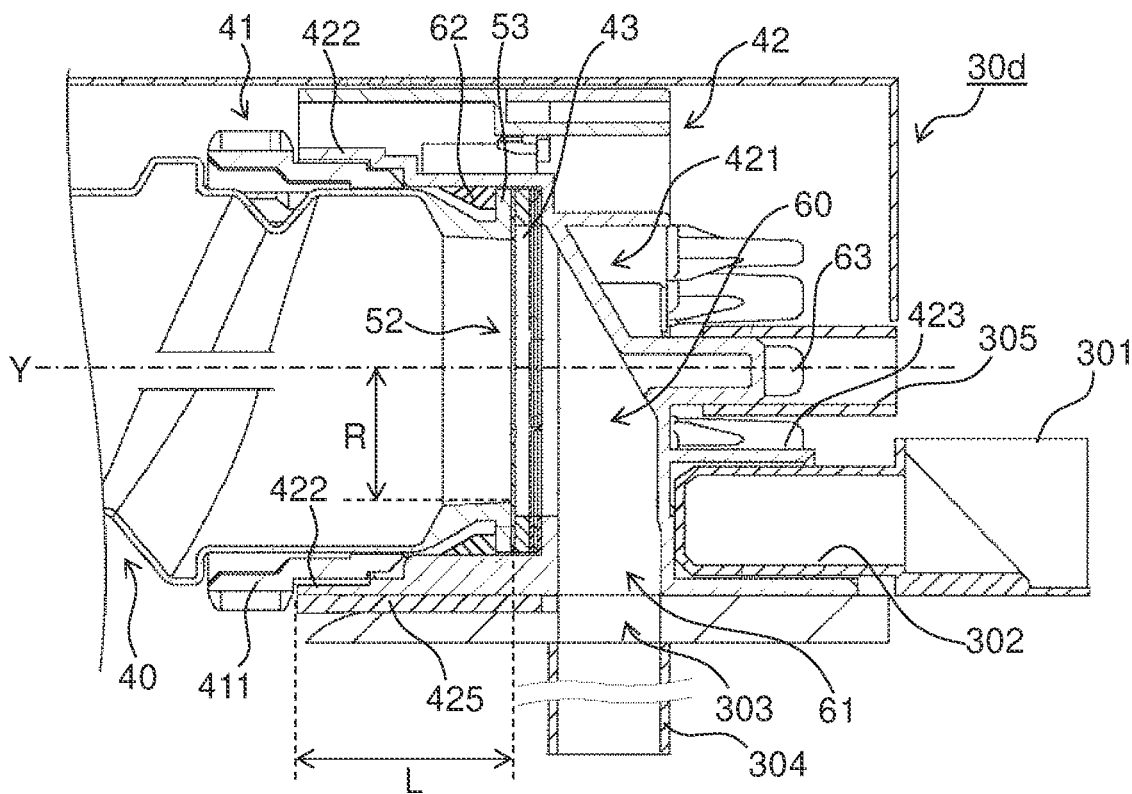
FIG. 8 is a cross-sectional view of the end portion of the toner container on the downstream side in the direction of insertion of the toner container taken along the axial direction in a state where the toner container is fitted to the container fitting portion.

FIG. 8 is a cross-sectional view of the end portion of the toner container 4d on the downstream side in the direction of insertion taken along the axial direction in a state where the toner container 4d is fitted to the container fitting portion 30d. When the toner container 4d is fitted to the container fitting portion 30d, as shown in FIG. 8, in a state where the engagement cylinder portion 423 of the cap member 42 of the toner container 4d engages with the boss 302 of the fitting portion side shutter 301 of the container fitting portion 30d, the main body portion 421 of the cap member 42 presses the boss 302. In this way, the fitting portion side shutter 301 is moved from a closed position to an open position, and thus the toner supply port 303 of the container fitting portion 30d is opened.

When the toner container 4d is fitted to the container fitting portion 30d, the cover side shutter 425 provided in the cap member 42 is moved from a closed position to an open position, and thus the toner discharge port 61 of the main body portion 421 of the cap member 42 is opened. Hence, the communication portion 60 of the main body portion 421 communicates with the supply pipe 304.

When the toner container 4d is fitted to the container fitting portion 30d as described above, a fitting protrusion 63 provided on the cover side restriction portion 424 of the cap member 42 of the toner container 4d is fitted into the fitting portion side restriction portion 305 of the container fitting portion 30d. In this way, the toner container 4d is located to the container fitting portion 30d.

Then, an operation of supplying the toner from the toner container 4d to the development device 3d of the image formation unit Pd in the image forming apparatus 100 will be described. Operations of supplying the toners from the toner containers 4a to 4c to the development devices 3a to 3c of the image formation units Pa to Pc are the same, and thus the description thereof is omitted.

When the toner is supplied from the toner container 4d to the development device 3d of the image formation unit Pd, as shown in FIG. 7, in a state where the toner container 4d is fitted to the container fitting portion 30d, a toner supply motor (not shown) is driven. In this way, a rotational driving force from the toner supply motor is transmitted to the transmission gear 41 of the toner container 4d via a gear train and a drive input gear (both of which are not shown), and thus the transmission gear 41 is rotated.

As the transmission gear 41 is rotated, the container main body 40 of the toner container 4d is rotated together with the transmission gear 41. In other words, the rotational driving force from the toner supply motor is transmitted to the container main body 40 by the transmission gear 41.

On the other hand, the cap member 42 and the seal member 43 in the toner container 4d are not rotated when the container main body 40 is rotated, and hold a rotation stop state. Hence, the container main body 40 is rotated relative to the cap member 42 and the seal member 43.

When the container main body 40 is rotated, the toner in the container main body 40 is conveyed by the conveyance rib 407 of the container main body 40 from the upstream side to the downstream side in the direction of conveyance of the toner, and the toner is discharged from the container main body 40 via the opening 52. The toner discharged from the container main body 40 via the opening 52 is introduced into the communication portion 60 of the main body portion 421 of the cap member 42. The toner introduced into the communication portion 60 is discharged from the communication portion 60 via the toner discharge port 61 of the main body portion 421. The toner discharged from the communication portion 60 via the toner discharge port 61 is introduced into the supply pipe 304 via the toner supply port 303 of the container fitting portion 30d and is supplied to the development device 3d of the image formation unit Pd from the supply pipe 304.

In the toner containers 4a to 4d of the present embodiment, the container main body 40 and the cap member 42 are flexibly connected by the seal member 43 at least a part of which is formed of an elastic material. In this way, it is possible to ensure sliding properties on the cap member 42 when the container main body 40 is rotated, to ensure the sealing properties of the connection portion between the container main body 40 and the cap member 42 and thereby to suppress the leakage of the toner.

Here, when wear and degradation of the seal member 43 occur, the sliding properties of the container main body 40 and the cap member 42 are lowered, and the toner easily leaks from between the container main body 40 and the cap member 42. Hence, it is important to maintain the sliding properties of the seal member 43 and ensure the anti-degradation thereof until the end of the usage period of the toner containers 4a to 4d. When the toner is charged into the toner containers 4a to 4d which have been used, and the toner containers 4a to 4d are reused, it is necessary to enhance the sliding properties and the anti-degradation of the seal member 43 to further extend the service life (life) of the seal member 43.

Hence, in the present disclosure, a relationship between the compression rate and the compression slip resistance of the first seal layer 431 of the seal member 43 and a relationship between the thicknesses and the compression residual strains of the seal layers of the seal member 43 (in the present embodiment, the first seal layer 431 and the second seal layer 433) are defined. In this way, it is found that the sealing properties, the sliding properties and the anti-degradation of the seal member 43 are enhanced. The seal member 43 will be described in detail below. It is assumed that the first adhesive layer 432 and the second adhesive layer 434 (see FIG. 7) are not included in the seal layers in the present specification.

(Compression Slip Resistance)

The compression slip resistance is a slip resistance which occurs between the seal member 43 and the flange portion 53 of the container main body 40 in a state where the seal member 43 is compressed at a predetermined compression rate. In the present embodiment, the compression slip resistance was measured based on a test method described below.

The seal member 43 was formed into a test piece of a predetermined size (30 mm×30 mm), and a sliding item (ABS) was brought into pressure contact, and thus the test piece was compressed at three compression rates of 10%, 20% and 30%. In a state where the test piece was compressed, the sliding item (ABS) was caused to slide at a constant speed (200 mm/s), and a tensile strength (compression slip resistance value) when the sliding item started to move was measured. A relationship between the compression rate and the compression slip resistance of the seal member 43 is shown in FIG. 9.

Figure 9:
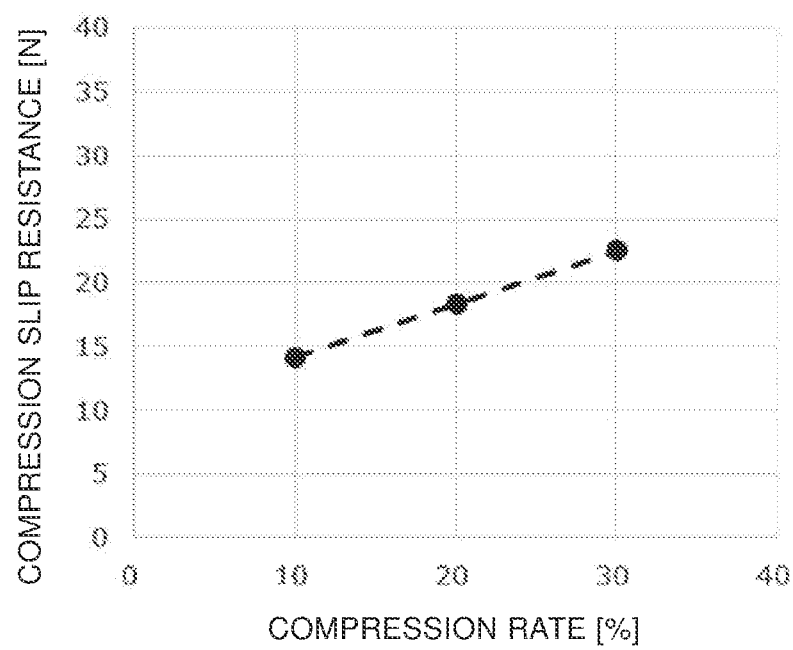
FIG. 9 is a graph showing a relationship between the compression rate and the compression slip resistance of the seal member.

As shown in FIG. 9, as the compression rate of the seal member 43 is increased, the compression slip resistance is increased. As the compression slip resistance is increased, the temperature of the seal member 43 is increased, and thus toner fusion to the seal member 43 easily occurs. On the other hand, when the compression rate is lowered to suppress an increase in the temperature of the seal member 43, the toner enters a gap between the seal member 43 and the flange portion 53, and thus toner fusion easily occurs.

As shown in Example described later, the stacking configuration of the seal member 43 was changed, a relationship between the compression slip resistance and the temperature caused by sliding was measured and thus conditions under which toner fusion to the seal member 43 would not occur were investigated. Consequently, it has been found that the change ratio (gradient) ρ/k of the compression slip resistance ρ [N] to the compression rate k [%] of the first seal layer 431 satisfies formula (1) below, and thus toner fusion is prevented from occurring.

$$0 < \rho/k < 0.3 \tag{1}$$

(Compression Residual Strain)

Figure 10:
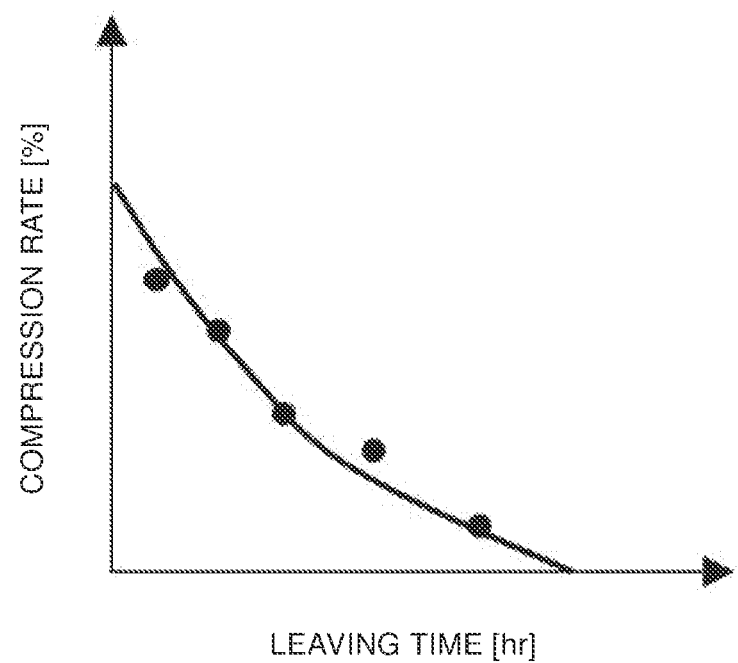
FIG. 10 is a graph showing a relationship between a leaving time and the compression rate after the seal member is compressed.

FIG. 10 is a graph showing a relationship between a leaving time [hr] and the amount of penetration of the seal member 43 when the seal member 43 was left in a state where the seal member 43 was compressed. As shown in FIG. 10, the amount of penetration of the seal member 43 is decreased as the leaving time is increased with the seal member 43 being compressed. In other words, as the leaving time is increased, the compression residual strain is increased. The compression residual strain is a strain which corresponds to a residual stress based on Hooke's law when an object is compressed. In the present embodiment, based on Japanese Industrial Standards (JIS K6401), the compression residual strains of the layers of the seal member 43 were measured. When it is assumed that the initial thickness of the seal member 43 is TO [mm] and the thickness after the test is Tx, the compression residual strain is calculated by the following calculation formula.

$$\text{compression residual strain }[\%] = \{(T0 - Tx)/T0\} \times 100$$

As the compression residual strain of the seal member 43 is increased, the anti-degradation is lowered, and thus toner leakage easily occurs. On the other hand, when a material whose compression residual strain is low is used in order to suppress the degradation of the seal member 43, the compression slip resistance is increased, with the result that toner fusion easily occurs.

As shown in Example described later, the stacking configuration of the seal member 43 was changed, a relationship between the compression residual strain and the anti-degradation was measured and thus conditions under which toner leakage wound not occur were investigated. Consequently, it has been found that the thickness $T_1$ [mm] in a stacking direction, and the compression residual strain $\varepsilon_1[\%]$ of the first seal layer 431, the thickness $T_2$ [mm] in the stacking direction, and the compression residual strain $\varepsilon_2[\%]$ of the second seal layer 433, the thickness $T_1$ [mm] in the stacking direction and the compression residual strain $\varepsilon_n$ [%] of the seal layer (in the present embodiment, no layer) other than the first seal layer and the second seal layer satisfy formula (2) below, and thus toner leakage is prevented from occurring.

$$0.04 < T_2\varepsilon_2/(T_1\varepsilon_1 + T_2\varepsilon_2 + \ldots T_n\varepsilon_n) < 0.48 \quad (2)$$

(Other Preferred Configurations)

Preferably, the first seal layer 431 of the seal member 43 is formed of a urethane foam, and its density is 200 to 480 [kg/m$^3$].

The thickness $T_0$ [mm] of the entire seal member 43 in a state where no external force is applied is preferably 1.1 to 2 times a gap [mm] between the flange portion 53 of the container main body 40 and the surface of the cap member 42 to which the seal member is attached. In this configuration, when the thickness of the first seal layer 421 is fixed, the thickness of the second seal layer 433 is increased, with the result that the anti-degradation can be expected to be enhanced by the second seal layer 433.

In the present embodiment, in the seal member 43 arranged in a coupling portion between the container main body 40 and the cap member 42 of each of the toner containers 4a to 4d, a material whose compression residual strain is low is used as the second seal layer 433, and thus the life of the seal member 43 can be extended, with the result that it is possible to suppress toner leakage during long storage.

Furthermore, as the surface layer, the first seal layer 431 which has low friction and elasticity and is formed with a urethane foam layer is stacked, and thus it is possible to achieve both sealing properties and sliding properties when the container main body 40 is rotated. When the sliding friction force (compression slip resistance) of the seal member 43 and the container main body 40 (flange portion 53) is large, toner aggregation or fusion may occur in the sliding portion of the seal member 43 and the container main body 40 due to an increase in the temperature of the seal member 43. However, in the present embodiment, the compression slip resistance is caused to fall in a certain range, and thus toner aggregation or fusion can be suppressed.

Since the performance required for the toner containers 4a to 4d can be satisfied only by the configuration of the seal member 43 alone, it is not necessary to complicate the configuration of the container fitting portions 30a to 30d and the container main body 40, with the result that the inexpensive and simple configuration is achieved. Hence, it is possible to suppress increases in the costs of the toner containers 4a to 4d and the image forming apparatus 100.

The present disclosure is not limited to the embodiment described above, and various changes can be made without departing from the spirit of the present disclosure. For example, although in the above embodiment, the seal member 43 is described which has two layers of the first seal layer 431 and the second seal layer 433 as the seal layers, seal layers other than the first seal layer 431 and the second seal layer 433 may be stacked. Examples of the configuration described above include a configuration in which one or more seal layers may be stacked between the first seal layer 431 and the second seal layer 433 or between the second seal layer 433 and the main body portion 421 of the cap member 42.

Although in the above embodiment, the seal member 43 is described which is used in each of the toner containers 4a to 4d where the cap member 42 is fixed when the container main body 40 and the transmission gear 41 are rotated, the seal member 43 of the present disclosure can also be used, for example, in a toner container where the cap member 42 is rotated with a linear speed difference (at low speed) relative to the container main body 40 and the transmission gear 41.

Although in the above embodiment, the toner containers 4a to 4d are described which are included in the image forming apparatus 100 incorporating the development devices 3a to 3d of a two-component development system using two-component developers containing a magnetic carrier and toners and which store the toners to be supplied to the development devices 3a to 3d, the present disclosure can be likewise applied to toner containers which store toners to be supplied to development devices of a magnetic one-component development system using magnetic toners or a non-magnetic one-component development system using non-magnetic toners.

The present disclosure is not limited to the tandem-type color printer as shown in FIG. 1, and can be applied to various image forming apparatuses using toner containers such as a color copying machine, a color multi-functional peripheral, a monochrome printer, a monochrome copying machine and a monochrome multi-functional peripheral. The effects of the present disclosure will be described in further detail below using Example.

Example

Relationships between the compression slip resistance, the compression residual strain and the thickness of the seal member 43 and the sliding properties and the anti-degradation of the seal member 43 were investigated. The sliding properties were evaluated with a temperature caused by sliding and toner fusion. The anti-degradation was evaluated with toner leakage.

In a method for evaluating the sliding properties, the toner container 4d was fitted to a test machine (made by KYOCERA Document Solutions Inc.) as shown in FIG. 1, and in environmental conditions, a temperature was set to 28° C., a relative humidity was set to 80% Rh and a temperature around the toner container 4d was increased to 43° C. In this state, a temperature in the vicinity of the sliding surface of the seal member 43 when a test image (print rate of 80%) was continuously output for 60 minutes was measured, and the compression slip resistance p [N] was estimated from the measured temperature. After the output of the image, the cap member 42 of the toner container 4d was removed, and whether or not toner fusion to the seal member 43 occurred was visually checked.

In a method for evaluating the anti-degradation, the seal member 43 was attached to the cap member 42, the container main body 40 in which no toner was stored was coupled thereto, the empty toner container 4d was assembled and the seal member 43 was compressed at a compression rate of 50%. In this state, the empty toner container 4d was stored under an environment of a temperature of 70° C. and a relative humidity of 95% Rh for 65 days. After the completion of the storage, the cap member 42 was removed from the empty toner container 4d, the cap member 42 was fitted to the container main body 40 separately prepared in which a toner was stored and thus the toner container 4d in which the toner was stored was assembled. The toner container 4d described above was fitted to a container drive jig, the container main body 40 was rotated and whether or not toner leakage occurred was determined.

The results of the evaluations of the sliding properties and the anti-degradation are shown in Table 1 together with the thickness $T_1$ of the first seal layer 431, the compression residual strain $\varepsilon_1$ of the first seal layer 431, the thickness $T_2$ of the second seal layer 433, the compression residual strain $\varepsilon_2$ of the second seal layer 433 and the change ratio $\rho/k$ of the compression slip resistance $\rho$ [N] to the compression rate k [%] of the first seal layer 431.

TABLE 1

| | | | | | $T_2 \varepsilon_2/$ | Sliding properties | | Anti-degradation | |
| | | | | | ($T_1 \varepsilon_1$ + | Toner | Temperature | Toner | Total |
| $\varepsilon_1$ | $\varepsilon_2$ | T1 | T2 | $\rho/k$ | $T_2 \varepsilon_2$) | fusion | of sliding | leakage | evaluation |
|---|---|---|---|---|---|---|---|---|---|
| 5.6 | 2.0 | 2 | 2 | 0.42 | 0.26 | x | 58 | o | x |
| 6.0 | 2.0 | 2 | 2 | 0.30 | 0.25 | x | 40 | o | x |
| 7.9 | 1.0 | 2 | 2 | 0.26 | 0.11 | o | 51 | o | o |
| 7.9 | 1.0 | 2 | 3 | 0.26 | 0.16 | o | 51 | o | o |
| 7.9 | 1.0 | 2.5 | 2.5 | 0.26 | 0.11 | o | 51 | o | o |
| 3.6 | 3.3 | 2 | 2 | 0.10 | 0.48 | o | 44 | x | x |
| 8.0 | 7.9 | 2 | 2 | 0.05 | 0.50 | o | 40 | x | x |
| 12.0 | 0.5 | 2 | 2 | 0.05 | 0.04 | o | 41 | x | x |

As shown in Table 1, it is found that in the sliding properties of the seal member 43, as the change ratio $\rho/k$ was decreased, toner fusion was unlikely to occur, and the temperature caused by sliding was low. This is considered to be caused by the lowering of frictional heat due to the lowering of frictional resistance during sliding. It has been confirmed from the results of Table 1 that $0 < \rho/k < 0.3$ is satisfied, and thus it is possible to suppress toner fusion.

It has been confirmed from the results of Table 1 that in the anti-degradation of the seal member 43, $0.04 < T_2\varepsilon_2/(T_1\varepsilon_1+T_2\varepsilon_2) < 0.48$ is satisfied, and thus it is possible to suppress toner leakage during long storage. This is considered to be because when $T_2\varepsilon_2/(T_1\varepsilon_1+T_2\varepsilon_2)$ exceeds 0.48, the degradation of the second seal layer 433 is increased to lower the anti-degradation whereas when $T_2\varepsilon_2/(T_1\varepsilon_1+T_2\varepsilon_2)$ is less than 0.04, the degradation of the second seal layer 433 is decreased but the degradation of the first seal layer 431 is increased, and thus the anti-degradation of the entire seal member 43 is lowered.

The present disclosure can be utilized for a toner storage container which stores a toner. By the utilization of the present disclosure, it is possible to provide a toner storage container which includes a seal member excellent in sealing properties, sliding properties and anti-degradation and can suppress toner fusion and toner leakage and an image forming apparatus which includes such a toner storage container.

What is claimed is:

1. A seal member that is arranged in a gap between a container main body and a cap member in a toner storage container,
the toner storage container being removable from an image forming apparatus and including:
the container main body that is cylindrical, stores a toner and is rotated;
a transmission gear that is fitted to an outer circumferential surface of the container main body on one end side in a state where a movement in a circumferential direction is restricted, and transmits a rotational driving force to the container main body; and
the cap member that covers an opening which is provided in one end portion of the container main body in a direction of a rotational axis line, and that holds a rotation stop state or is rotated at a speed lower than the container main body and the transmission gear when the container main body and the transmission gear are rotated,
wherein the seal member has a multilayer structure including a plurality of seal layers, the seal layers include:
a first seal layer which is opposite the container main body; and
a second seal layer which is opposite the cap member and in which a ratio of a thickness of the second seal layer to a thickness of the entire seal member is equal to or greater than 50% and
the seal member satisfies formulae (1) and (2) below:

$$0 < \rho/k < 0.3 \quad (1)$$

$$0.04 < T_2\varepsilon_2/(T_1\varepsilon_1 + T_2\varepsilon_2 + \ldots \ T_n\varepsilon_n) < 0.48 \quad (2)$$

where $\rho$ is a compression slip resistance [N] of the first seal layer,
k is a compression rate [%] of the first seal layer,
$T_1$ is a thickness [mm] of the first seal layer in a stacking direction,
$\varepsilon_1$ is a compression residual strain [%] of the first seal layer,
$T_2$ is the thickness [mm] of the second seal layer in the stacking direction,
$\varepsilon_2$ is a compression residual strain [%] of the second seal layer,
$T_n$ is a thickness [mm] of the seal layer other than the first seal layer and the second seal layer in the stacking direction and
$\varepsilon_n$ is a compression residual strain [%] of the seal layer other than the first seal layer and the second seal layer.

2. The seal member according to claim 1, wherein the seal layers include only the first seal layer and the second seal layer.

3. The seal member according to claim 1, wherein the first seal layer is formed of a urethane foam having a density of 200 to 480 [kg/m³].

4. The seal member according to claim 1, wherein the thickness of the entire seal member in a state where no external force is applied is 1.1 to 2 times the gap.

5. The seal member according to claim 1, wherein the seal member is fixed to a surface of the cap member opposite the opening.

6. A toner storage container comprising:

the container main body that is cylindrical, stores a toner and is rotated;

the transmission gear that is fitted to an outer circumferential surface of the container main body on one end side in a state where a movement in a circumferential direction is restricted, and transmits a rotational driving force to the container main body;

the cap member that covers an opening which is provided in one end portion of the container main body in a direction of a rotational axis line, and that holds a rotation stop state or is rotated at a speed lower than the container main body and the transmission gear when the container main body and the transmission gear are rotated; and the seal member according to claim 1 that is arranged in a gap between the container main body and the cap member.

* * * * *